(12) United States Patent
Suzuki

(10) Patent No.: US 8,638,663 B2
(45) Date of Patent: Jan. 28, 2014

(54) WIRELESS COMMUNICATION SYSTEM, GATEWAY APPARATUS, TERMINAL ALLOCATION METHOD, AND PROGRAM

(75) Inventor: Takehiro Suzuki, Tokyo (JP)

(73) Assignee: NEC Corporation, Tokyo (JP)

(*) Notice: Subject to any disclaimer, the term of this patent is extended or adjusted under 35 U.S.C. 154(b) by 260 days.

(21) Appl. No.: 13/123,937

(22) PCT Filed: Oct. 7, 2009

(86) PCT No.: PCT/JP2009/067481
§ 371 (c)(1),
(2), (4) Date: Apr. 13, 2011

(87) PCT Pub. No.: WO2010/052988
PCT Pub. Date: May 14, 2010

(65) Prior Publication Data
US 2011/0200012 A1 Aug. 18, 2011

(30) Foreign Application Priority Data
Nov. 7, 2008 (JP) ................................. 2008-286346

(51) Int. Cl.
*G01R 31/08* (2006.01)
*H04W 4/00* (2009.01)

(52) U.S. Cl.
USPC ........................................ 370/230.1; 370/331

(58) Field of Classification Search
None
See application file for complete search history.

(56) References Cited

U.S. PATENT DOCUMENTS

| 2004/0121805 A1* | 6/2004 | Kikuchi ........................ 455/560 |
| 2006/0014541 A1* | 1/2006 | Kato ............................. 455/446 |
| 2007/0298803 A1* | 12/2007 | Kawabata et al. ............ 455/436 |
| 2008/0101243 A1* | 5/2008 | Fukui et al. ................... 370/238 |
| 2008/0137612 A1* | 6/2008 | Gallagher et al. ............ 370/331 |
| 2008/0144496 A1* | 6/2008 | Bachmutsky .............. 370/230.1 |
| 2009/0156213 A1* | 6/2009 | Spinelli et al. ............... 455/436 |
| 2010/0093364 A1* | 4/2010 | Ribeiro et al. ............ 455/452.2 |
| 2010/0135205 A1* | 6/2010 | Li et al. ........................ 370/328 |
| 2010/0309784 A1* | 12/2010 | Mihaly et al. ................ 370/230 |

FOREIGN PATENT DOCUMENTS

| CN | 1697536 A | 11/2005 |
| CN | 1723731 A | 1/2006 |
| JP | 2004194072 A | 7/2004 |
| JP | 2005252502 A | 9/2005 |
| WO | 2008/093218 A2 | 8/2008 |

OTHER PUBLICATIONS

International Search Report for PCT/JP2009/067481, mailed Jan. 12, 2010.

(Continued)

*Primary Examiner* — Eunsook Choi

(57) ABSTRACT

A wireless communication system of the present invention includes: terminals; a base station that performs wireless communication with the terminals; a gateway apparatus that manages the terminals and the base station; and a server apparatus that authenticates the terminals. The gateway apparatus includes: at least one C-plane processor that processes C-plane; and N U-plane processors that process U plane. Each of the N U-plane processors notifies the C-plane processor of its own load status. The server apparatus notifies the C-plane processor of service levels of target terminals that try to perform entry to a network in which the base station and the gateway apparatus are located. The C-plane processor allocates, based on the load status of each of the N U-plane processors and the service levels of the target terminals, one of the N U-plane processors as an entry destination to the target terminals.

9 Claims, 6 Drawing Sheets

(56) References Cited

OTHER PUBLICATIONS

WiMAX Forum Network Architecture (Stage 2: Architecture Tenets, Reference Model and Reference Points), 3GPP-WiMAX Interworking, Release 1, Version 1. 2. 2, May 10, 2008, pp. 3-5.

WiMAX Forum Network Architecture (Stage 2: Architecture Tenets, Reference Model and Reference Points), Part 1, Release 1, Version 1.2.2, May 10, 2008, pp. 27.

WiMAX Forum Network Architecture (Stage 3: Detailed Protocols and Procedures), Release 1, Version 1.2.2, May 10, 2008, pp. 122-128.

Taiwanese Office Action for TW 098137460 dated on Apr. 11, 2013 with Partial English Translation.

Chinese Office Action for CN Appl. No. 200980143286.6 issued on May 9, 2013 with English Translation.

* cited by examiner

Fig. 1 -- RELATED ART --
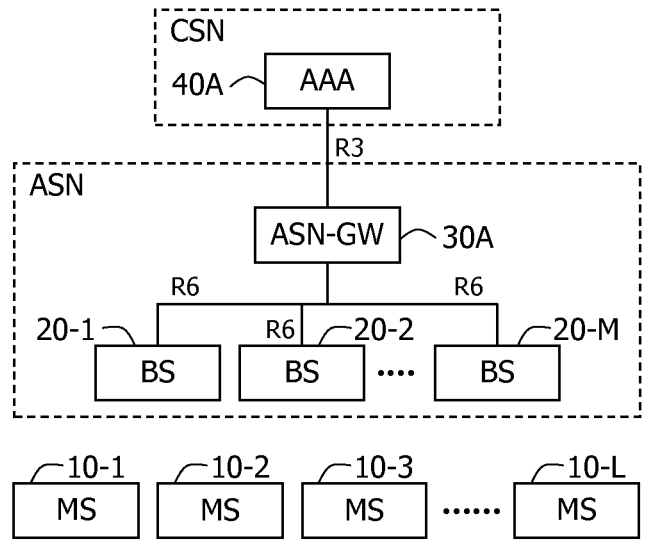
Fig. 2 -- RELATED ART --
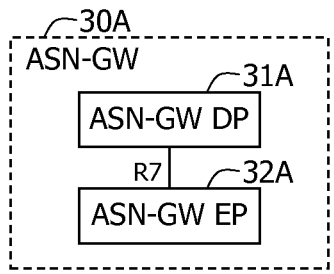

WIRELESS COMMUNICATION SYSTEM, GATEWAY APPARATUS, TERMINAL ALLOCATION METHOD, AND PROGRAM

This application is the National Phase of PCT/JP2009/067481, filed Oct. 7, 2009, which claims priority from Japanese Patent Application No. 2008-286346 filed Nov. 7, 2008, which is incorporated by reference herein in its entirety.

TECHNICAL FIELD

The present invention relates to a wireless communication system, a gateway apparatus, a terminal allocation method, and a program.

BACKGROUND ART

In WiMAX (Worldwide Interoperability for Microwave Access) Forum, WiMAX has been established based on IEEE (Institute of Electrical and Electronic Engineers) 802. 16e Standard.

The WiMAX is characterized by achieving a fast communication speed of 200 Mbs or more in spite of wireless communication, and by providing services such as guaranteeing of a band, for a MS (Mobile Station: terminal), to acquire a transmission rate appropriate to a QoS (Quality of Service) class to which the MS belongs.

A configuration of a wireless communication system of the WiMAX is disclosed in, for example, Non-patent Literature 1. FIG. 1 shows an example of a configuration of the wireless communication system of the WiMAX.

As shown in FIG. 1, the wireless communication system of the WiMAX includes MSs 10-1~10-L (L is an integer of 2 or more), BSs (Base station) 20-1~20-M (M is an integer of 2 or more) and ASN-GW (Access Service Network-Gateway) 30A located in an ASN, and AAA (Authentication, Authorization, Accounting) server 40A located in CSN (Connectivity Service Network). FIG. 1 shows only components related to the present invention.

BSs 20-1~20-M are base stations that perform wireless communication with MSs 10-1~10-L.

AAA server 40A is a server apparatus that authenticates, gives permission to, and makes charges to MSs 10-1~10-L.

ASN-GW 30A is a gateway apparatus that manages subordinate BSs 20-1~20-M and MSs 10-1~10-L. In other words, ASN-GW 30A centrally controls the ASN.

When the number of MSs 10-1~10-L increases, to deal with the increase, there is a method of simply increasing the number of ASN-GWs 30A.

However, this method has a problem in which the costs for facility investment increase. As an alternative method, therefore, a method of increasing the number of MSs 10-1~10-L that is allowed entry to one ASN-GW 30A is considered promising.

A configuration of ASN-GW 30A is disclosed in, for example, Non-patent Literature 2. FIG. 2 shows an example of a configuration of ASN-GW 30A.

As shown in FIG. 2, ASN-GW 30A includes ASN-GW DP (Decision Point) 31A and ASN-GW EP (Enforcement Point) 32A.

ASN-GW DP 31A is a C-plane processing unit that processes a C plane (Control Plane) for controlling signaling to transfer a control signal. A burst load is accordingly applied on ASN-GW 31A during entry of MSs 10-1~10-L to the ASN or during hand-over.

ASN-GW EP 32A is a U-plane processing unit that processes a U plane (User Plane) for transferring user data of MSs 10-1~10-L that is included in its own entry. Thus, a steady load tends to be applied on ASN-GW EP 32A.

Therefore, in the WiMAX Forum, as a method of increasing the number of MSs 10-1~10-L that is allowed entry to one ASN-GW 30A, a method of setting a configuration ratio of ASN-GW DP 31A and ASN-GW EP 32A to 1:N (N is an integer of 2 or more) is discussed.

CITATION LIST

Non-Patent Literature

Non-patent Literature 1: WiMAX Forum Network Architecture (Stage 2), 3GPP-WiMAX Interworking, Release 1, Version 1.2.2, (May 10, 2008)

Non-patent Literature 2: WiMAX Forum Network Architecture (Stage 2), Part 1, Release 1. Version 1.2.2 (May 10, 2008)

SUMMARY OF INVENTION

Technical Problem

As described above, when the configuration ratio of the ASN-GW DP and the ASN-GW EP is set to 1:N, to prevent concentration of loads on a particular ASN-GW EP, loads of N ASN-GW EPs must be dispersed.

However, in the WiMAX Forum, there is provided no method of dispersing the loads of the N ASN-GW EPs. Therefore, consideration is given to applying a general load dispersion method.

However, the general load dispersion method is designed such that the system side mainly uniformizes the loads, and hence no consideration is given to services provided by the WiMAX, namely, services appropriate to a QoS class to which the MS belongs.

As a result, when the general load dispersion method is applied, there is a problem of a possible failure of providing services to a MS that belongs to a QoS class of a high service level, namely, a MS to which services are preferentially provided.

It is therefore an object of the present invention to provide a wireless communication system, a gateway apparatus, a terminal allocation method, and a program that can solve the above problem.

Solution to Problem

A wireless communication system according to the present invention is a wireless communication system comprising: terminals; a base station that performs wireless communication with the terminals; a gateway apparatus that manages the terminals and the base station; and a server apparatus that authenticates the terminals, wherein the gateway apparatus includes:

at least one C (Control)-plane processing unit that processes a C-plane; and

N (N is an integer of 2 or more) U (User)-plane processing units that process a U plane, each of the N U-plane processing units notifies the C-plane processing unit of its own load status, the server apparatus notifies the C-plane processing unit of service levels of target terminals that try to perform entry to a network in which the base station and the gateway apparatus are located, and the C-plane processing unit allocates, based on the load status of each of the N U-plane processing units and the service levels of the target terminals, one of the N U-plane processing units as an entry destination to the target terminals.

A gateway apparatus according to the present invention is a gateway apparatus for managing terminals and a base station, comprising:

at least one C-plane processing unit that processes a C-plane; and

N U-plane processing units that process a U plane, wherein each of the N U-plane processing units includes:

a load status information notification unit that notifies the C-plane processing unit of its own load status, and the C-plane processing unit includes:

a load status information acquisition unit that acquires information on a load status from each of the N U-plane processing units;

a service level information acquisition unit that acquires information on service levels of target terminals that try to perform entry to a network in which the base station and the gateway apparatus are located; and a terminal allocation unit that allocates, based on the load status of each of the N U-plane processing units and the service levels of the target terminals, one of the N U-plane processing units as an entry destination to the target terminals.

A terminal allocation method according to the present invention is a terminal allocation method implemented by a gateway apparatus for managing terminals and a base station, the gateway apparatus including:

at least one C-plane processing unit that processes a C-plane; and

N U-plane processing units that process a U plane, the terminal allocation method comprising:

a load status information notification step of notifying, by each of the N U-plane processing units, the C-plane processing unit of its own load status;

a load status information acquisition step of acquiring, by the C-plane processing unit, information on a load status from each of the N U-plane processing units;

a service level information acquisition step of acquiring, by the C-plane processing unit, information on service levels of target terminals that try to perform entry to a network in which the base station and the gateway apparatus are located; and a terminal allocation step of allocating, by the C-plane processing unit, based on the load status of each of the N U-plane processing units and the service levels of the target terminals, one of the N U-plane processing units as an entry destination to the target terminals.

A program according to the present invention is a program for causing a gateway apparatus for managing terminals and a base station to execute, the gateway apparatus including at least one C-plane processing unit that processes a C-plane, and N U-plane processing units that process a U plane:

a load status information notification step of notifying, by each of the N U-plane processing units, the C-plane processing unit of its own load status;

a load status information acquisition step of acquiring, by the C-plane processing unit, information on a load status from each of the N U-plane processing units;

a service level information acquisition step of acquiring, by the C-plane processing unit, information on service levels of target terminals that try to perform entry to a network in which the base station and the gateway apparatus are located; and a terminal allocation step of allocating, by the C-plane processing unit, based on the load status of each of the N U-plane processing units and the service levels of the target terminals, one of the N U-plane processing units as an entry destination to the target terminals.

Effects of Invention

According to the present invention, the C-plane processing unit allocates, based on the load status of each of the N U-plane processing units and the service level of the target terminal, one of the N U-plane processing units as an entry destination to the target terminal.

Thus, load dispersion can be performed with consideration given not only to the load statuses of the N U-plane processing units but also to the service level of the target terminal.

BRIEF DESCRIPTION OF DRAWINGS

FIG. 1 shows an example of a configuration of a related wireless communication system.

FIG. 2 is a block diagram showing an example of a configuration of a related ASN-GW.

MODES FOR CARRYING OUT INVENTION

Hereinafter, best modes for carrying out the present invention are described with reference to the drawings.

In the exemplary embodiment, a wireless communication system is described by taking an example of a wireless communication system of WiMAX. However, the present invention is not limited to the exemplary embodiment.

Figure 3:
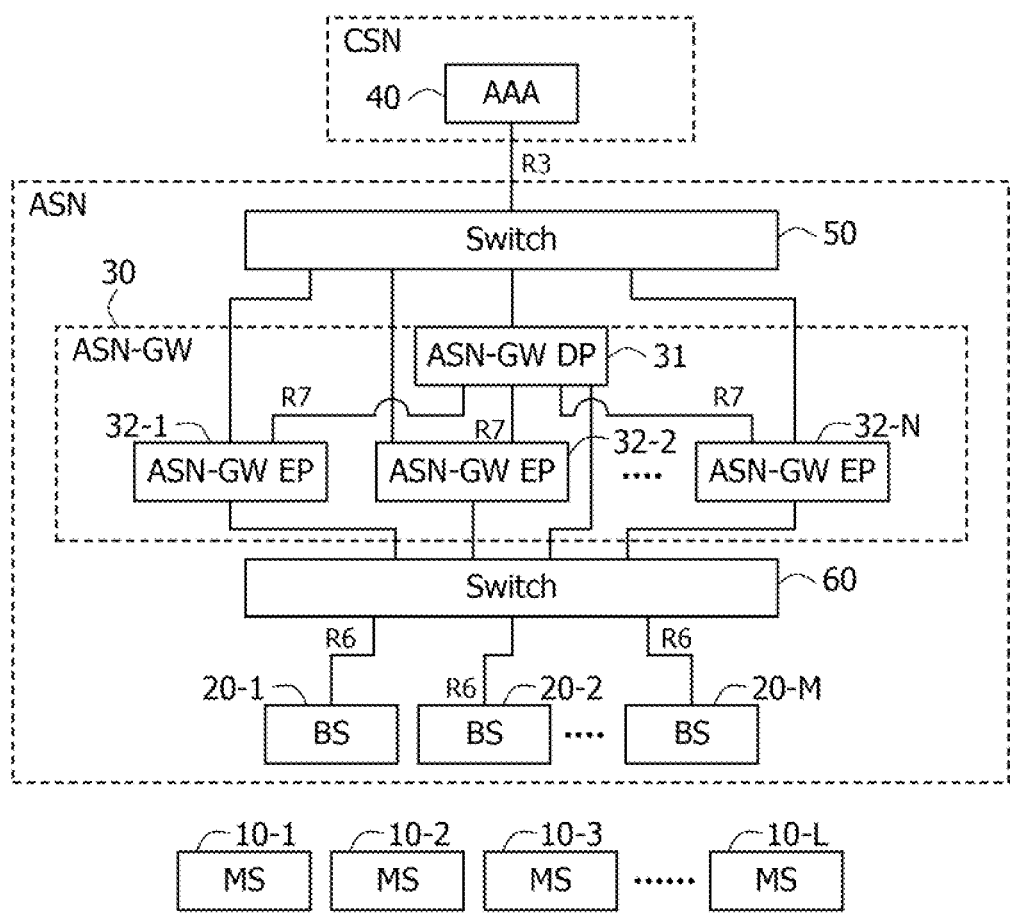
FIG. 3 shows a configuration of a wireless communication system according to an exemplary embodiment of the present invention.

FIG. 3 shows a configuration of the wireless communication system according to the exemplary embodiment of the present invention.

As shown in FIG. 3, the wireless communication system according to the exemplary embodiment is different from that shown in FIG. 1 in that ASN-GW 30A and AAA server 40A are respectively changed to ASN-GW 30 and AAA server 40, and switches 50 and 60 are added. Other components are similar to those shown in FIG. 1, and are denoted by similar reference numerals.

ASN-GW 30 includes one ASN-GW DP 31 that serves as a C-plane processing unit, and N (N is an integer of 2 or more) ASN-GW EPs 32-1~32-N that serve as U-plane processing units.

Switch 50 connects AAA sever 40 to ASN-GW DP 31 and ASN-GW EPs 32-1~32-N. Switch 60 connects BSs 20-1~20-M to ASN-GW DP 31 and ASN-GW EPs 32-1~32-N. Switches 50 and 60 can be routers.

AAA sever 40 and ASN-GW 30 are interconnected via a R3 interface, ASN-GW DP 31 and ASN-GW EPs 32-1~32-N are interconnected via a R7 interface, and ASN-GW 30 and BSs 20-1~20-M are interconnected via a R6 interface.

Figure 4:
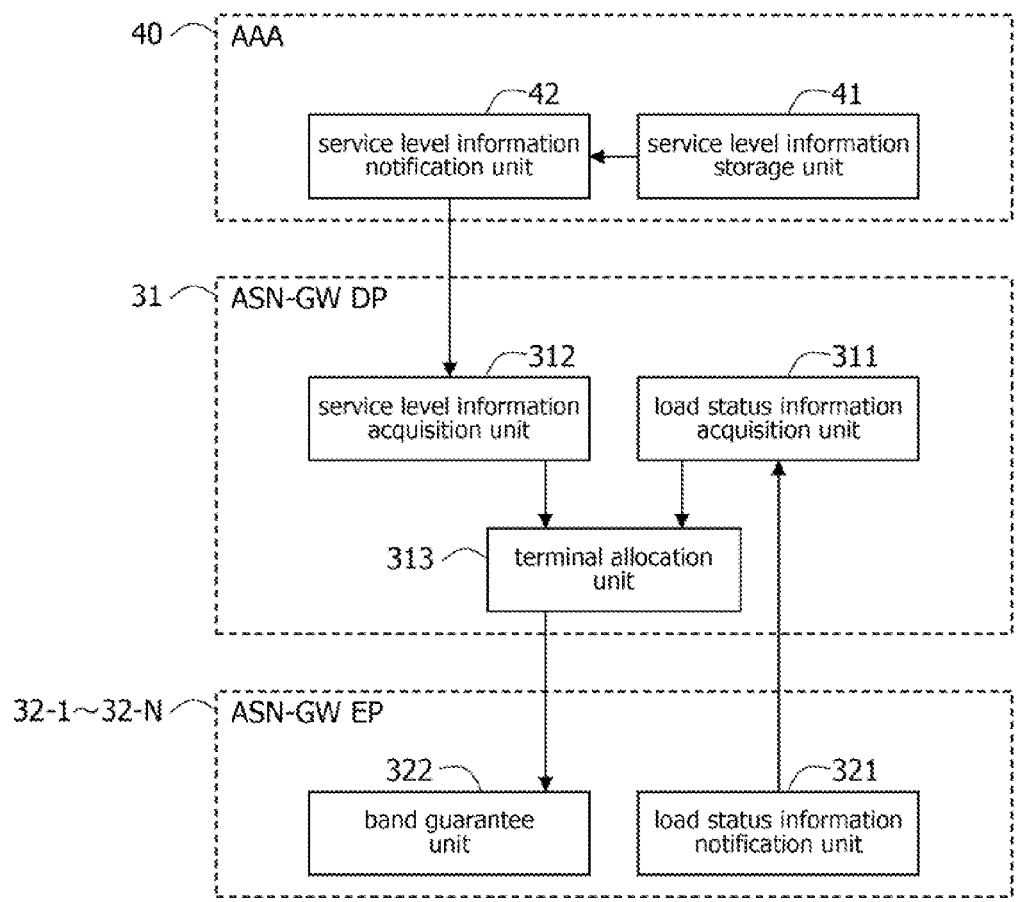
FIG. 4 is a block diagram showing examples of configurations of an AAA server, an ASN-GW DP, and an ASN-GW EP shown in FIG. 3.

FIG. 4 shows examples of configurations of AAA server 40, ASN-GW DP 31, and ASN-GW EPs 32-1~32-N. FIG. 4 shows only essential components related to the present invention.

AAA server 40 includes service level information storage unit 41 and service level information notification unit 42.

Service level information storage unit 41 stores service level information indicating a service level of each of MSs 10-1~10-L. A service level standard indicates that an environment where each of MSs 10-1~10-L can stably perform U-plane communication is provided.

Figures 5, 6:
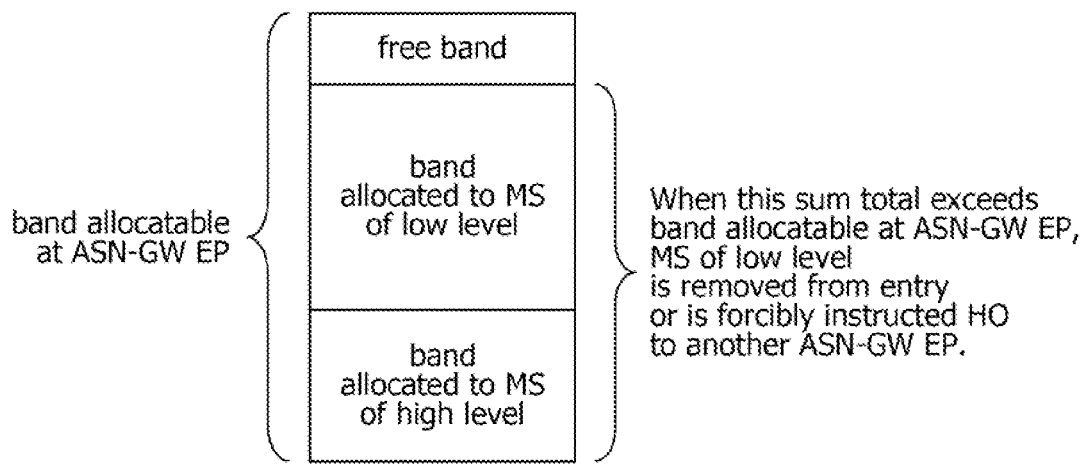
FIG. 5 shows an example of a service level of each of MSs stored in a service level information storage unit shown in FIG. 4.
FIG. 6 is an explanatory diagram showing an operation principle of a band guarantee unit shown in FIG. 4.

According to the present exemplary embodiment, as shown in FIG. 5, service level information storage unit 41 stores a service level of each of MSs 10-1~10-L classified as "High", "Low", or "Mid". For classification of service levels, for example, a method of classifying service levels according to a comparison result of a transmission rate appropriate to a QoS class to which MSs 10-1~10-L belong with a predetermined threshold value can be employed. However, the present invention is not limited to this method.

Service level information notification unit 42 reads a service level of target MS 10 that tries to perform entry to the ASN from service level information storage unit 41, and notifies ASN-GW DP 31 of the service level.

ASN-GW DP 31 includes load status information acquisition unit 31, service level information acquisition unit 312, and terminal allocation unit 313.

Load status information acquisition unit 311 acquires load status information indicating a load status (average CPU usage rate, entry number of MSs, average memory usage rate, or average used band) of each of ASN-GW EPs 32-1~32-N. The load status is notified from each of ASN-GW EPs 32-1 to 32-L as described below.

Service level information acquisition unit 312 acquires service level information indicating the service level of target MS 10, which has been notified from AAA server 40.

Terminal allocation unit 313 allocates, based on the load status of each of ASN-GW EPs 32-1~32-N and the service level of target MS 10, one of ASN-GW EPs 32-1~32-N as an entry destination to target MS 10.

In this case, according to the exemplary embodiment, terminal allocation unit 313 first classifies a level of a load status of each of ASN-GW EPs 32-1~32-N as "High" or "Low". For classification of levels of load statuses, for example, a method of classifying the levels according to the comparison result of numerical values of the load statuses with a predetermined threshold value can be employed. However, the present invention is not limited to this method.

Terminal allocation unit 313 classifies a service level of target MS 10 as "High" or "Low". For classification of service levels, for example, a method of classifying levels as high when a service level notified from AAA server 40 is "high", and low in other cases can be employed. However, the present invention is not limited to this method.

Then, when the service level of target MS 10 is "High", terminal allocation unit 313 allocates ASN-GW EP 32 having a "Low" load status level among ASN-GW EPs 32-1~32-N. In this case, when there is a plurality of ASN-GW EPs 32 having "Low" load status levels, terminal allocation unit 313 can allocate arbitrary one among ASN-GW EPs 32, or one having a lowest numerical value of a load status among ASN-GW EPs 32.

On the other hand, when the service level of target MS 10 is "Low", terminal allocation unit 313 allocates ASN-GW EP 32 having a "High" load status level among ASN-GW EPs 32-1~32-N. A method of allocation when there is a plurality of ASN-GW EPs 32 having "High" load status levels is similar to that described above.

Terminal allocation unit 313 then notifies ASN-GW EP 32, allocated as an entry destination, of target MS 10 and the service level thereof.

Each of ASN-GW EPs 32-1~32-N includes load status information notification unit 321 and band guarantee unit 322.

Load status information notification unit 321 notifies ASN-GW DP 31 of its own load status.

Band guarantee unit 322 makes target MS 10, which has been notified from ASN-GW DP 31, to perform entry to the ASN.

However, as shown in FIG. 6, each of ASN-GW EPs 32-1~32-N has a predetermined band allocatable by itself. Band guaranteeing for MS 10 that newly performs entry may exceed the allocatable band.

In this case, band guarantee unit 322 removes, among MSs 10 included in its own entry, MS 10 having a "Low" service level from the entry, or instructs forcible hand-over (HO) of such MS 10 to another ASN-GW EP 32. In this case, when there is a plurality of MSs 10 having "Low" service levels, band guarantee unit 322 can set, as a target of the operation, arbitrary MS 10 among such MSs 10 or arbitrary MS 10 among MSs 10 having lowest values of service levels (MSs having service levels managed "Low" at AAA server 40) among such MSs 10. It is presumed that band guarantee unit 322 continues the operation by adding target MSs 10 until an allocatable band or less is reached by the operation.

Hereinafter, referring to FIG. 7, an operation of the wireless communication system according to the exemplary embodiment is described.

Figure 7:
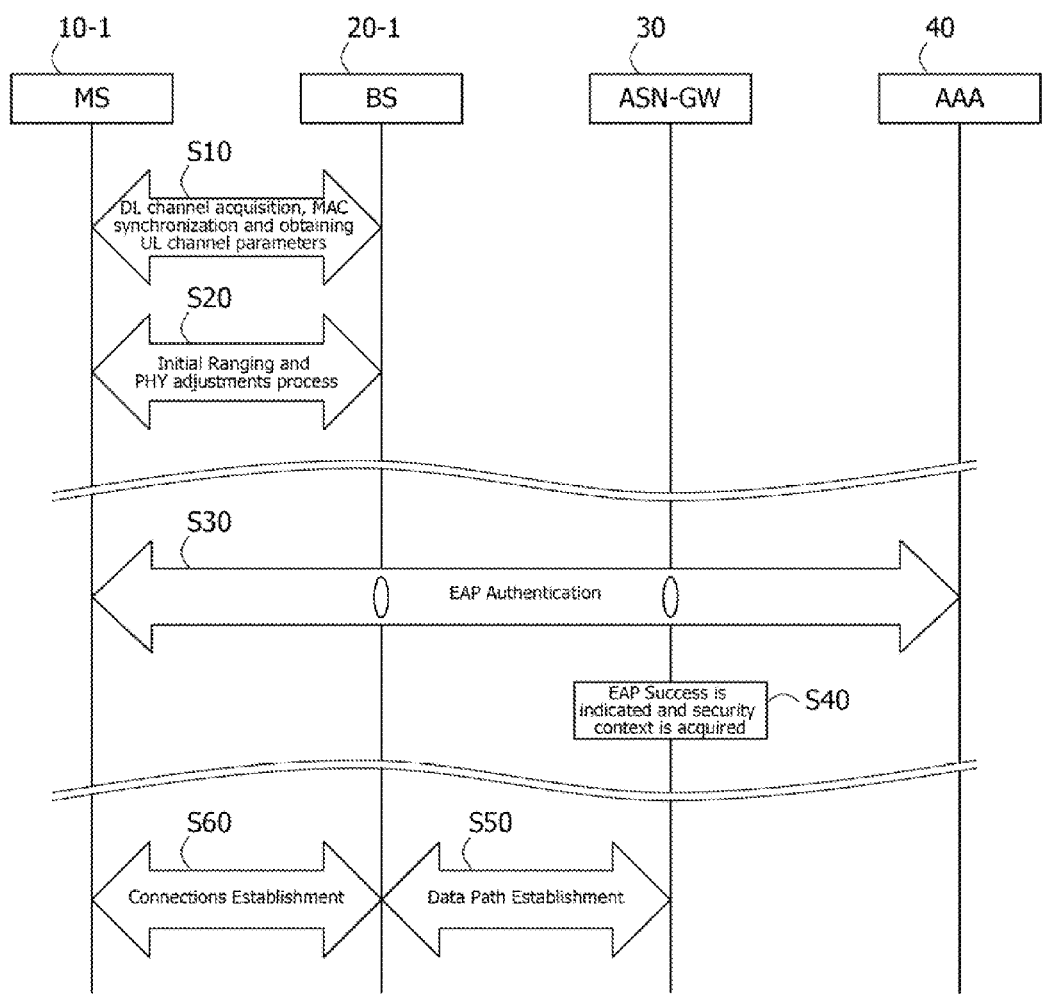
FIG. 7 is a sequence diagram showing an example of an entry operation of the MS to an ASN in the wireless communication system shown in FIG. 3.

FIG. 7 shows a partial excerpt from FIGS. 4-33 indicating an operation during entry of the MS to the ASN, namely an operation when MS 10-1 performs entry to the ASN via BS 20-1, in Non-patent Literature 3 (WiMAX Forum Network Architecture (Stage 3), Release 1, Version 1.2.2 (May 10, 2008)). In FIG. 7, it is presumed that each of ASN-GW EPs 32-1~32-N has notified ASN-GW DP 31 of its load status.

First, in steps S10 and S20, MS 10-1 performs entry to the ASN via BS 20-1.

In this case, in step S10, between MS 10-1 and BS 20-1, acquisition of a DL (Down Link) channel (DL channel acquisition), synchronization with a MAC (Media Access Control) layer (MAC synchronization), and acquisition of parameters of an UL (Up Link) channel by MS 10-1 are performed.

In step S20, between MS 10-1 and base 20-1, initial ranging for adjusting transmission power, transmission timing, and a frequency at MS 10-1 (Initial Ranging), and adjustment of a PHY (Physical Layer) (PHY adjustment process) are performed.

Thereafter, in step S30, AAA sever 40 authenticates MS 10-1 by using EAP (Extensible Authentication Protocol) (EAP Authentication).

After completion of the authentication in step S30, in step S40, ASN-GW 30 receives a notification of the completion of the authentication (EAP Success is indicated) and a notification of a context (security context is acquired) from AAA server 40.

During processing of step S40, service level information notification unit 42 of AAA server 40 notifies ASN-GW DP 31 of a service level of target MS 10-1 together with the notification of the context.

Thereafter, in step S50, between ASN-GW 30 and BS 20-1, a data path is established (Data Path Establishment). In step S60, between MS 10-1 and BS 20-1, wireless connection is established (Connection Establishment).

During processing of step S50, terminal allocation unit 313 of ASN-GW 30 first classifies a load status level of each of ASN-GW EPs 32-1~32-N as "High" or "Low", and then classifies a service level of MS 10-1 as "High" or "Low".

Terminal allocation unit 313 then allocates, when the service level of MS 10-1 is "High", one of ASN-GW EPs 32 having "Low" load status levels as an entry destination to MS 10-1.

On the other hand, when the service level of MS 10-1 is "Low", terminal allocation unit 313 allocates one of ASN-GW EPs 32 having "High" load status levels to MS 10-1.

Figure 8:
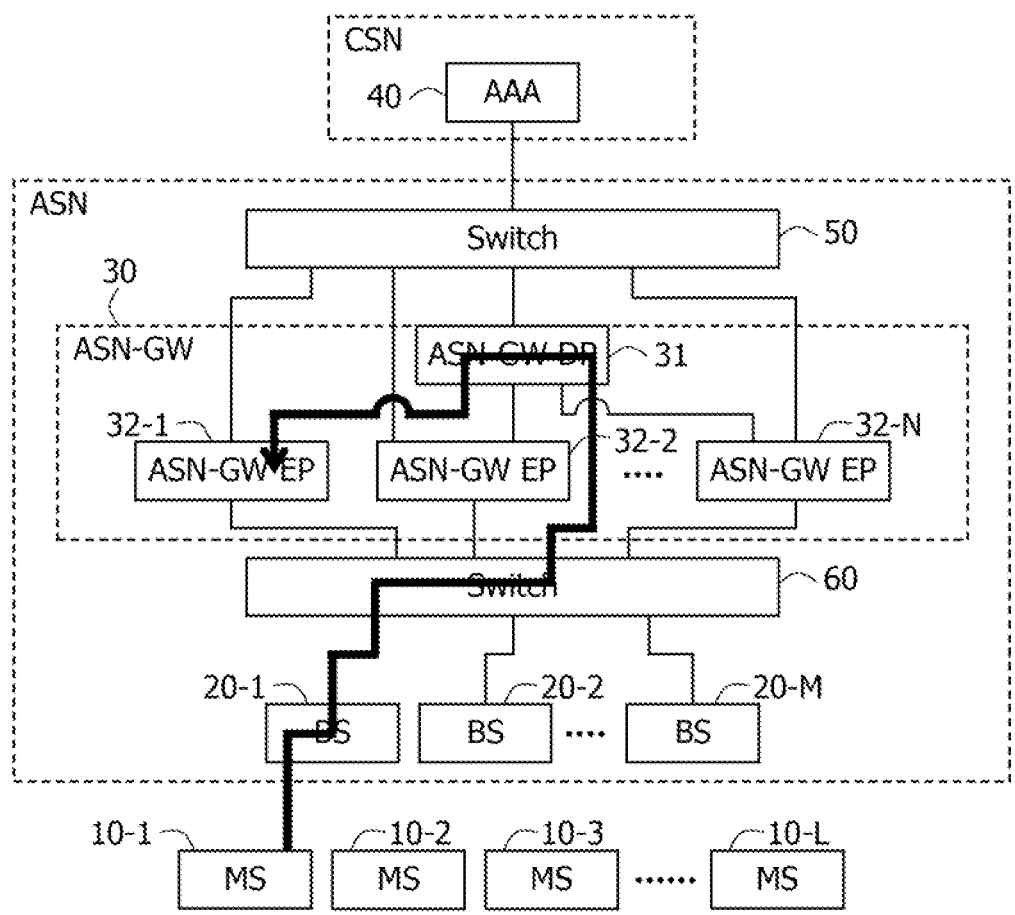
FIG. 8 is an explanatory diagram showing a flow until ASN-GW-EPs are allocated to the MSs in the wireless communication system shown in FIG. 3.

It is presumed that the service level of MS 10-1 is "Low", and terminal allocation unit 313 allocates, as an entry destination of MS 10-1, ASN-GW EP 32-1 having a "High" load status level. FIG. 8 shows a flow until ASN-GW EP 32-1 is allocated to MS 10-1 as described above.

In this case, terminal allocation unit 313 transmits, to ASN-GW EP 32-1, a notification that the target is MS 10-1 and the service level of MS 10-1 is "Low". This notification is transmitted via the R7 interface.

ASN-GW EP 32-1 that has received the notification makes MS 10-1 to perform entry to ASN-GW EP 32-1.

However, when a band allocatable by itself is exceeded due to guaranteeing of a hand for MS 10-1 to newly perform entry, band guarantee unit 322 removes, from among MSs 10 included in its own entry, MS 10 having a "Low" service level from the entry or instructs handing-over of such MS 10 to another ASN-GW EP 32.

As described above, according to the exemplary embodiment, ASN-GW DP 31 allocates, based on the load status of each of ASN-GW EPs 32-1~32-N and the service level of target MS 10, one of ASN-GW EPs 32-1~32-N as an entry destination to target MS 10.

As a result, load dispersion with consideration given not only to the load statuses of ASN-GW EPs 32-1~32-N but also to the service level of MS 10 that tries to perform entry to the ASN can be performed.

According to the exemplary embodiment, when a band allocatable by itself is exceeded due to entry of target MS 10, which has been notified from ASN-GW DP 31, each of ASN-GW EPs 32-1~32-N removes, from among MSs 10 included in its own entry, MS 10 having a "Low" service level from the entry, or instructs handing-over of such MS 10 to another ASN-GW EP.

As a result, a band can be acquired for MS 10 having a "High" service level, enabling differentiation of MS 10 having the "High" service level from MS 10 having a "Low" service level.

The method implemented in ASN-GW 30 according to the present invention can be applied to a program executed by a computer. The program can be stored in a storage medium, and provided to the outside via a network.

The present invention has been described with reference to the exemplary embodiment. However, the present invention is not limited to the exemplary embodiment. Various changes can be made to the configuration and details of the present invention within a scope that are understandable to those skilled in the art.

The method implemented in ASN-GW 30 according to the present invention can be applied to a program executed by a computer. The program can be stored in a storage medium, and provided to the outside via a network.

The invention claimed is:

1. A wireless communication system comprising: terminals; a base station that performs wireless communication with the terminals; a gateway apparatus that manages the terminals and the base station; and a server apparatus that authenticates the terminals, wherein the gateway apparatus includes:
at least one C (Control)-plane processing unit that processes a C-plane; and
N (N is an integer of 2 or more) U (User)-plane processing units that process a U plane,
each of the N U-plane processing units notifies the C-plane processing unit of its own load status,
the server apparatus notifies the C-plane processing unit of service levels of target terminals that try to perform entry to a network in which the base station and the gateway apparatus are located, and
the C-plane processing unit allocates, based on the load status of each of the N U-plane processing units and the service levels of the target terminals, one of the N U-plane processing units as an entry destination to the target terminals,
wherein the C-plane processing unit
classifies a level of the load status as "High" or "Low",
classifies the service level as "High" or "Low", and
allocates a U-plane processing unit having a high load status level as an entry destination to a terminal having a low service level from among the target terminals, and a U-plane processing unit having a low load status level as an ent destination to a terminal having a high service level.

2. The wireless communication system according to claim 1, wherein
the C-plane processing unit notifies the U-plane processing unit allocated as the entry destination, of the target terminal and the service level of the terminal, and
each of the N U-plane processing units, when a band allocatable by the U-plane processing unit itself is exceeded due to entry of the target terminal, which has been notified from the C-plane processing unit, removes the terminal having the low service level, from among the terminals that have been included in its own entry, from an entry.

3. The wireless communication system according to claim 1, wherein
the C-plane processing unit notifies the U-plane processing unit allocated as the entry destination, of the target terminal and the service level of the terminal, and
each of the N U-plane processing units, when a band allocatable by the U-plane processing unit itself is exceeded due to entry of the target terminal, which has been notified from the C-plane processing unit, instructs handing-over of the terminal having the low service level, from among the terminals that have been included in its own entry, to another U-plane processing unit.

4. A gateway apparatus for managing terminals and a base station, comprising:
at least one C-plane processing unit that processes a C-plane; and
N U-plane processing units that process a U plane,
wherein each of the N U-plane processing units includes:
a load status information notification unit that notifies the C-plane processing unit of its own load status, and
the C-plane processing unit includes:
a load status information acquisition unit that acquires information on a load status from each of the N U-plane processing units;
a service level information acquisition unit that acquires information on service levels of target terminals that try to perform entry to a network in which the base station and the gateway apparatus are located; and a terminal allocation unit that allocates, based on the load status of each of the N U-plane processing units and the service levels of the target terminals, one of the N U-plane processing units as an entry destination to the target terminals, wherein the terminal allocation unit classifies a level of the load status as "High" or "Low", classifies the service level as "High" or "Low", and allocates a U-plane processing unit having a high load status level as an entry destination to a terminal having a low service level from among the target terminals, and a U-plane processing unit having a low load status level as an ent destination to a terminal having a high service level.

5. The gateway apparatus according to claim 4, wherein the terminal allocation unit notifies the U-plane processing unit allocated as the entry destination, of the target terminal and the service level of the terminal, each of the N U-plane processing units further includes:

a band guarantee unit that removes, when a band allocatable by the U-plane processing unit itself is exceeded due to entry of the target terminal, which has been notified from the C-plane processing unit, the terminal having the low service level, from among the terminals that have been included in its own entry, from an entry.

6. The gateway apparatus according to claim 4, wherein the terminal allocation unit notifies the U-plane processing unit allocated as the entry destination, of the target terminal and the service level of the terminal, each of the N U-plane processing units further includes:

a band guarantee unit that instructs, when a band allocatable by the U-plane processing unit itself is exceeded due to entry of the target terminal, which has been notified from the C-plane processing unit, handing-over of the terminal having the low service level, from among the terminals that have been included in its own entry, to another U-plane processing unit.

7. A terminal allocation method implemented by a gateway apparatus for managing terminals and a base station, the gateway apparatus including:

at least one C-plane processing unit that processes a C-plane; and

N U-plane processing units that process a U plane, the terminal allocation method comprising:

a load status information notification step of notifying, by each of the N U-plane processing units, the C-plane processing unit of its own load status;

a load status information acquisition step of acquiring, by the C-plane processing unit, information on a load status from each of the N U-plane processing units;

a service level information acquisition step of acquiring, by the C-plane processing unit, information on service levels of target terminals that try to perform entry to a network in which the base station and the gateway apparatus are located; and a terminal allocation step of allocating, by the C-plane processing unit, based on the load status of each of the N U-plane processing units and the service levels of the target terminals, one of the N U-plane processing units as an entry destination to the target terminals, wherein in the terminal allocation step, a level of the load status is classified as "High" or "Low", the service level is classified as "High" or "Low", and a U-plane processing unit having a high load status level is allocated as an entry destination to a terminal having a low service level from among the target terminals, and a U-plane processing unit having a low load status level is allocated as an en destination to a terminal having a high service level.

8. The terminal allocation method according to claim 7, wherein in the terminal allocation step, the U-plane processing unit allocated as the entry destination is notified of the target terminal and the service level of the terminal, the terminal allocation method further comprising a band guarantee step of removing, by the U-plane processing unit, when a band allocatable by the U-plane processing unit itself is exceeded due to entry of the target terminal, which has been notified from the C-plane processing unit, the terminal having the low service level, from among the terminals that have been included in its own entry, from an entry.

9. The terminal allocation method according to claim 7, wherein in the terminal allocation step, the U-plane processing unit allocated as the entry destination is notified of the target terminal and the service level of the terminal, the terminal allocation method further comprising a band guarantee step of instructing, by the U-plane processing unit, when a band allocatable by the U-plane processing unit itself is exceeded due to entry of the target terminal, which has been notified from the C-plane processing unit, handing-over of the terminal having the low service level, from among the terminals that have been included in its own entry, to another U-plane processing unit.

* * * * *